(12) United States Patent
Iwata et al.

(10) Patent No.: US 7,458,356 B2
(45) Date of Patent: Dec. 2, 2008

(54) SPRING APPARATUS AND VALVE TRAIN OF INTERNAL COMBUSTION ENGINE USING THE SAME

(75) Inventors: Kazuo Iwata, Yokohama (JP);
Takeyoshi Shimbori, Yokohama (JP);
Koichiro Yamada, Yokohama (JP);
Noritoshi Takamura, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 11/706,771

(22) Filed: Feb. 15, 2007

(65) Prior Publication Data

US 2007/0193547 A1  Aug. 23, 2007

(30) Foreign Application Priority Data

Feb. 20, 2006  (JP) .............................. 2006-042597

(51) Int. Cl.
*F01L 3/10* (2006.01)
*F16F 13/00* (2006.01)
(52) U.S. Cl. .............................. 123/188.13; 123/90.66; 137/375; 251/282; 267/64.25
(58) Field of Classification Search ............ 123/188.13, 123/188.12, 90.66, 90.65, 90.67; 137/375, 137/340; 251/129.07, 282; 267/64.25
See application file for complete search history.

(56) References Cited

U.S. PATENT DOCUMENTS

| | | | |
|---|---|---|---|
| 5,586,529 A | 12/1996 | Vallve | |
| 6,182,684 B1 * | 2/2001 | Frankenberg | ............... 137/340 |
| 6,233,926 B1 | 5/2001 | Bailey et al. | |
| 6,279,544 B2 | 8/2001 | Rumpf | |
| 6,293,266 B1 | 9/2001 | Oetting | |
| 6,378,848 B1 * | 4/2002 | Uchida et al. | ............ 267/64.25 |
| 6,382,246 B2 | 5/2002 | Mori et al. | |

FOREIGN PATENT DOCUMENTS

| | | |
|---|---|---|
| EP | 1 067 011 A1 | 1/2001 |
| JP | 58-217711 A | 12/1983 |
| JP | 10-288012 A | 10/1998 |

* cited by examiner

*Primary Examiner*—Stephen K. Cronin
*Assistant Examiner*—Hyder Ali
(74) *Attorney, Agent, or Firm*—Frishauf, Holtz, Goodman & Chick, P.C.

(57) ABSTRACT

A bellows unit and a compression coil spring are located in series with each other between a first member and a second member. The bellows unit has an inner bellows, an outer bellows, and first and second end members. A sealed space is defined in the bellows unit. A compressed gas is sealed in the sealed space. The bellows unit is caused to extend and contract in the direction of an axis by the compressed gas. The sealed space contains an uncompressible liquid that can exchange heat with the gas. The liquid is an example of a heat exchange material.

7 Claims, 6 Drawing Sheets

SPRING APPARATUS AND VALVE TRAIN OF INTERNAL COMBUSTION ENGINE USING THE SAME

CROSS-REFERENCE TO RELATED APPLICATIONS

This application is based upon and claims the benefit of priority from prior Japanese Patent Application No. 2006-042597, filed Feb. 20, 2006, the entire contents of which are incorporated herein by reference.

BACKGROUND OF THE INVENTION

1. Field of the Invention

The present invention relates to a spring apparatus adapted for use in, for example, a valve train or the like of an internal combustion engine.

2. Description of the Related Art

A valve train of an internal combustion engine comprises an intake valve, an exhaust valve, a valve spring (compression coil spring) for urging these valves in their closing direction, a cam mechanism for driving the valves in their opening direction, etc. The intake valve serves to open and close an intake port in a cylinder head. The exhaust valve serves to open and close an exhaust port in the cylinder head. An installation load and a maximum load of the valve spring are set to appropriate values to prevent the valves jumping and bouncing when the engine is operated at high-speed rotation. At the time of low-speed rotation, the force of inertia of the valve train is lower than at the time of high-speed rotation. During low-speed rotation, therefore, the load on the valve spring may be smaller than during high-speed rotation. If the valve spring used is a compression coil spring, however, the spring load cannot be changed according to the speed of rotation, high or low.

A gas spring is used in a valve train described in Jpn. Pat. Appln. KOKAI Publication No. 10-288012 (Prior Art 1), for example. Use of the gas spring enables the spring load to be changed, depending on the speed of rotation. This valve train comprises a gas pressure adjusting mechanism for changing the pressure of the gas spring. The pressure of the gas spring at the time of low-speed rotation is made lower than the spring pressure at the time of high-speed rotation. By doing this, the spring load can be lowered to reduce a friction loss during low-speed rotation.

On the other hand, a valve train described in Jpn. Pat. Appln. KOKAI Publication No. 58-217711 (Prior Art 2) comprises a compression coil spring and a hydraulic chamber. The hydraulic chamber has a function to switch the height of a spring seat for the compression coil spring. This valve train changes the amount of compression by varying the capacity of the hydraulic chamber to change the height of the spring seat.

The valve train of Prior Art 1 requires use of a gas pressure adjusting mechanism, a pressure supply source, etc. for changing the pressure of the gas spring. The gas pressure adjusting mechanism is composed of a solenoid changeover valve and pipes. Therefore, this valve train is complicated in structure and has a high cost. Further, changing the gas pressure requires external power and energy, possibly exerting a bad influence on the fuel consumption.

The valve train of Prior Art 2 changes the pressure in the hydraulic chamber in accordance with the speed of rotation of the internal combustion engine. Therefore, it requires use of a hydraulic mechanism, a hydraulic source, etc. for changing the pressure in the hydraulic chamber. The hydraulic mechanism of this type is also composed of a solenoid changeover valve and pipes. Thus, the valve train is complicated in structure and has a high cost. Further, there is a problem that energy is needed to change the hydraulic pressure.

BRIEF SUMMARY OF THE INVENTION

The present invention provides a spring apparatus with a simple construction capable of dispensing with a solenoid changeover valve, pipes, and external power for changing spring pressure.

A spring apparatus according to the present invention comprises a first member having an axis; a second member which reciprocates in the direction of the axis with respect to the first member, a bellows unit which is located between the first member and the second member and is configured to extend and contract in the direction of the axis, and has a sealed space therein; a gas which is sealed in a compressed state in the sealed space of the bellows unit and serves to extend the bellows unit in the direction of the axis; and an uncompressible heat exchange material which is contained in the sealed space of the bellows unit and serves to exchange heat with the gas.

According to the present invention, there may be provided a spring apparatus in which the spring load of a valve train can be changed in accordance with the operating state of an internal combustion engine or the like. The valve train of the invention is simple in construction, since it can dispense with a solenoid changeover valve and pipes for spring load change. Further, the valve train does not require any external power or special energy for spring load change either.

An example of the heat exchange material is a liquid. Preferably, a heat exchange promoting member with a higher thermal conductivity than the liquid is located between the gas and the liquid. Further, an example of the heat exchange material may be a solid.

One form of the bellows unit has an inner bellows, an outer bellows which is located outside the inner bellows so as to be concentric with the inner bellows and defines the sealed space in conjunction with the inner bellows, a first end member located between one end of the inner bellows and one end of the outer bellows, and a second end member located between the other end of the inner bellows and the other end of the outer bellows, and the second member has a shaft portion internally passed through the inner bellows in the direction of the axis.

The spring apparatus of the invention may further comprise a compression coil spring located in series with the bellows unit between the first member and the second member.

Another form of the bellows unit has an inner bellows, an outer bellows which is located outside the inner bellows so as to be concentric with the inner bellows and defines the sealed space in conjunction with the inner bellows, a first end member located between one end of the inner bellows and one end of the outer bellows, and a second end member located between the other end of the inner bellows and the other end of the outer bellows, and wherein a recess is formed in the first end member so as to indent the bellows unit, the recess containing a part of the compression coil spring.

Element wires of an effective portion of the compression coil spring may be in contact with one another when the compression coil spring is compressed so that a distance between the first member and the second member is not larger than a predetermined value. Further, the spring apparatus may further comprise a stopper portion for regulating an extension stroke of the bellows unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A spring apparatus according to a first embodiment of the present invention will now be described with reference to FIGS. 1 and 2.

Figure 1:
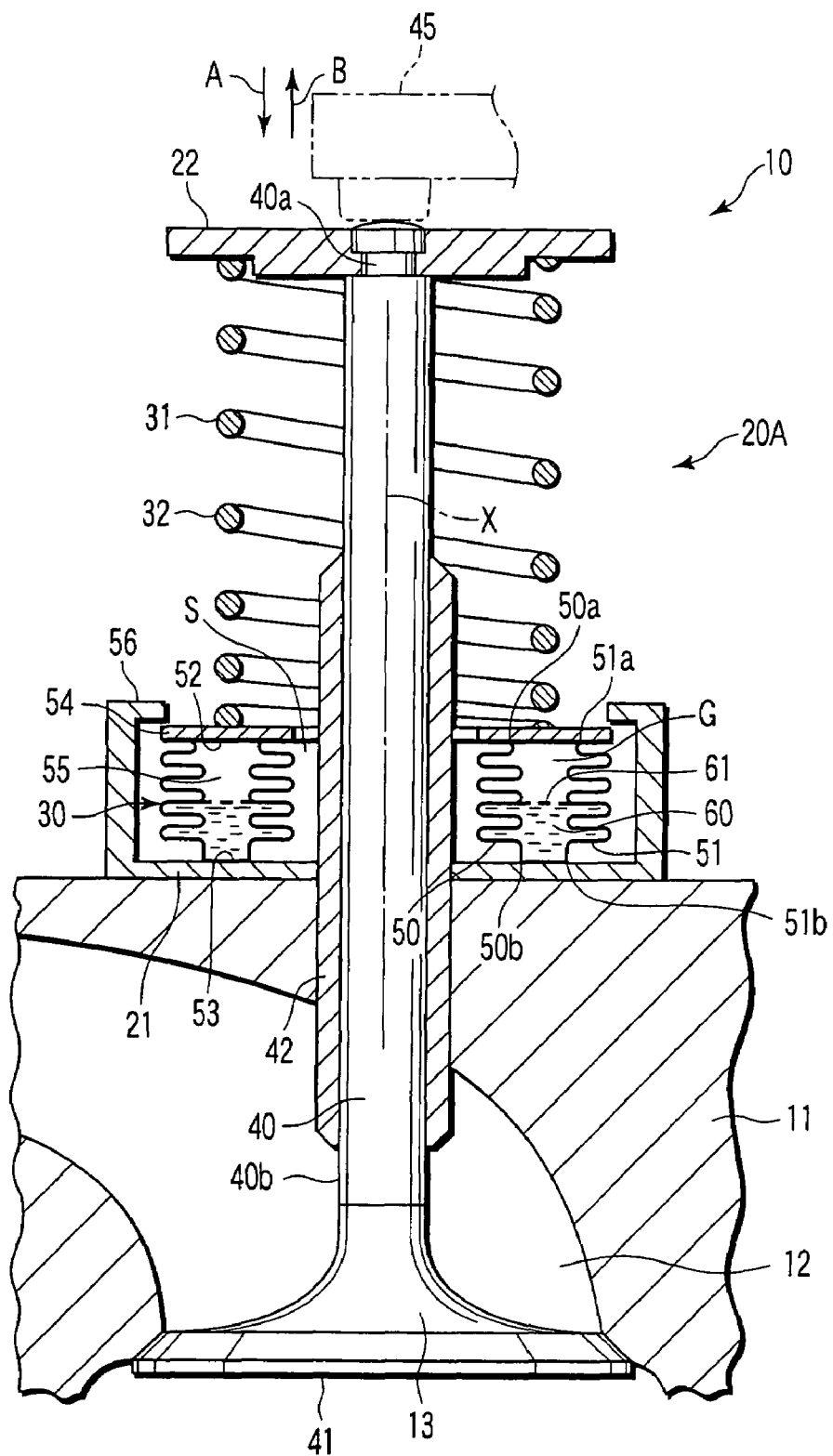
FIG. 1 is a sectional view of a valve train provided with a spring apparatus according to a first embodiment of the invention.

FIG. 1 shows a part of a valve train 10 of an internal combustion engine. An intake port 12 and an exhaust port (not shown) are formed in a cylinder head 11. The valve train 10 comprises an intake valve 13 for opening and closing the intake port 12, and a spring apparatus 20A that urges the intake valve 13 in a valve opening direction. Since a valve train that is attached to the exhaust port is constructed in the same manner as the valve train 10 for the intake valve 13, a description thereof will be omitted. The valve train 10 for the intake valve 13 will now be described as a representative.

The spring apparatus 20A used in the valve train 10 of the present embodiment includes a stationary spring receiving member 21 as a spring seat, a movable spring receiving member 22 as a retainer, a bellows unit 30, a compression coil spring 31, etc. The stationary spring receiving member 21 is an example of a first member. The movable spring receiving member 22 is an example of a second member. The bellows unit 30 and the compression coil spring 31 are located in series in the direction of an axis X between the spring receiving members 21 and 22.

The valve 13 comprises a shaft portion 40 having the axis X and a disc 41 for opening and closing the port 12. The shaft portion 40 extends in the direction of the axis X, and is inserted in a cylindrical valve guide 42 that is attached to the cylinder head 11. The shaft portion 40 can reciprocate in the direction of the axis X.

The stationary spring receiving member 21 as an example of the first member is attached to the cylinder head 11. The movable spring receiving member 22 as an example of the second member is fixed to one end 40a of the shaft portion 40. The disc 41 is provided on the other end 40b of the shaft portion 40. The valve 13 and the movable spring receiving member 22 reciprocate in the direction of the axis X with respect to the stationary spring receiving member 21.

A valve driving member 45, e.g., a rocker arm, engages the one end 40a of the shaft portion 40. The valve driving member 45 is driven by a cam (not shown). This cam rotates in association with the rotation of a crankshaft of the internal combustion engine. Thus, the number of reciprocations per unit time of the valve 13 fluctuates depending on the rotational speed of the engine.

Figure 2:
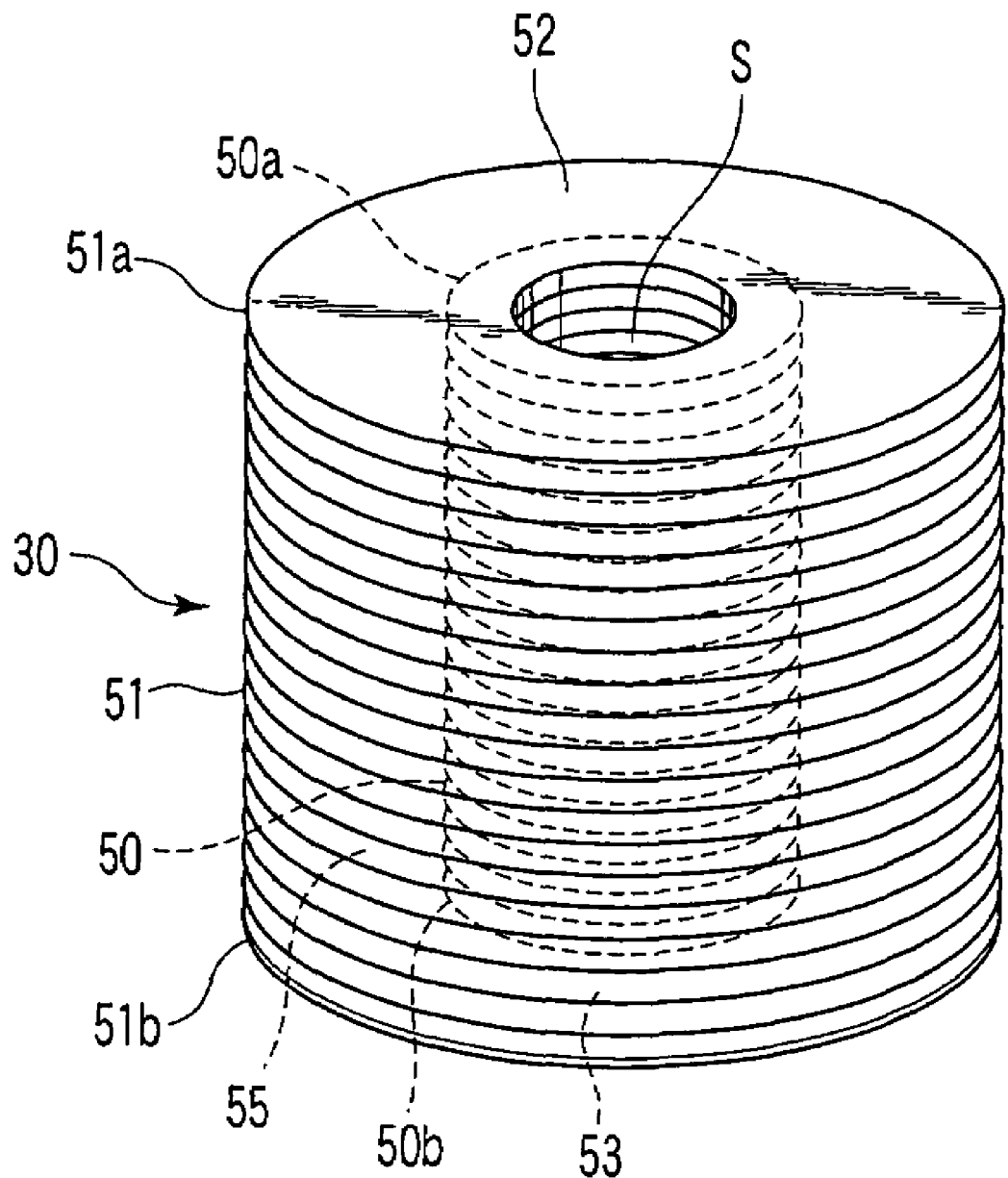
FIG. 2 is a perspective view of a bellows unit of the spring apparatus shown in FIG. 1.

As shown in FIGS. 1 and 2, the bellows unit 30 includes a metallic inner bellows 50, a metallic outer bellows 51, a first end member (first bellows cap) 52, and a second end member (second bellows cap) 53. The bellows unit 30 can extend and contract in the direction of the axis X. The outer bellows 51 is located outside and concentrically with the inner bellows 50. The first end member 52 may also be used as a spring seat 54 for receiving the underside of the compression coil spring 31. The second end member 53 may double as the stationary spring receiving member 21.

The first end member 52 is located between one end 50a of the inner bellows 50 and one end 51a of the outer bellows 51. The second end member 53 is located between the respective other ends 50b and 51b of the inner and outer bellows 50 and 51. The shaft portion 40 is passed through a space S inside the inner bellows 50. By way of example, the inner and outer bellows 50 and 51 are in the form of a hollow circular cylinder each. Alternatively, however, each of the bellows 50 and 51 may be in any other form than a cylindrical form, e.g., in the form of a tube having an elliptic or polygonal cross section perpendicular to the axis X.

A sealed space 55 is defined between the inner and outer bellows 50 and 51. It is surrounded by the bellows 50 and 51 and the end members 52 and 53. A gas G as an example of a compressible fluid is sealed in a compressed state in the space 55. The bellows unit 30 is extended in the direction of the axis X by the pressure of the gas G. The bellows unit 30 constructed in this manner serves as a gas spring that urges the valve 13 toward its closed position.

Preferably, an inner gas such as nitrogen should be used as the gas G. In some cases, however, air may be used in place of an inert gas. The spring apparatus 20A is provided with a stopper portion 56. The stopper portion 56 regulates an extension stroke of the bellows unit 30.

A liquid 60 is contained in the sealed space 55 of the bellows unit 30. The liquid 60 is an example of an uncompressible heat exchange material that can exchange heat with the gas G. The gas spring capacity of the sealed space 55 can be adjusted in accordance with the quantity of the liquid 60. Thus, the liquid 60 can also serve for spring constant adjustment. While water is an example of the liquid 60, it may be replaced with oil, alcohol, or the like.

A heat exchange promoting member 61 is provided between the gas G and the liquid 60. The thermal conductivity of the promoting member 61 is higher than that of the liquid 60. The heat exchange promoting member 61 is used to promote heat exchange between the gas G and the liquid 60. The heat exchange promoting member 61 may be an aggregate of metallic filaments, metallic fins, or a heat pipe.

The thermal conductivity of the gas G is much lower than that of the liquid 60. While the thermal conductivity of water is 0.61 W/(m·K) at normal temperature (300 K), for example, that of air is as low as 0.0261 W/(m·K). In the case of this embodiment, however, heat exchange between the gas G and the liquid 60 is promoted by the heat exchange promoting member 61, so that heat conduction between the gas and the liquid can be carried out efficiently. If the promoting member 61 is made of metal such as copper, for example, its thermal conductivity is 398 W/(m·K). This value is much larger than the values for the gas G and the liquid 60. If a heat pipe is used for the heat exchange promoting member 61, the thermal conductivity of this member can be further enhanced.

The compression coil spring 31 is located compressed between the bellows unit 30 and the movable spring receiving member 22. The bellows unit 30 and the spring 31 are located in series in the direction of the axis X.

When the compression coil spring 31 of the present embodiment is in a compressed state such that the distance between the spring receiving members 21 and 22 is not larger than a predetermined value, each turns of the element wire 32 of its effective portion are spaced apart from one another. However, each turns of the element wire 32 may be configured to be in contact with one another when the coil spring 31 is compressed so that the distance between the spring receiving members 21 and 22 is not larger than the predetermined value. In this case, only the bellows unit 30 is compressed after a predetermined value is exceeded by the lifting of the valve 13 so that each turns of the element wire 32 of the spring 31 touch one another. Therefore, a load variation effect corresponding to the valve lifting can be produced, so that a nonlinear spring characteristic can be obtained, for example. According to the compression coil spring 31 with its each turns of the element wire 32 in contact with one another, a surge-suppression effect can be exhibited.

The following is a description of the operation of the valve train 10 that comprises the spring apparatus 20A according to the present embodiment.

When the internal combustion engine is running, its crankshaft rotates, whereupon the valve driving member 45 reciprocates in the directions indicated by arrows A and B in FIG. 1. If the valve driving member 45 moves in the direction of arrow A, the valve 13 moves in its opening direction, that is, in the direction to open the port 12. Thereupon, the bellows unit 30 and the compression coil spring 31 are individually compressed in the direction of the axis X. Thus, a repulsive load between the bellows unit 30 and the spring 31 increases.

If the valve driving member 45 moves in the direction of arrow B, the valve 13 moves in its closing direction, urged by the repulsive load between the bellows unit 30 and the compression coil spring 31. In other words, the valve 13 moves in the direction to close the port 12. Since the spring 31 extends in the direction of the axis X when this is done, the repulsive load between the bellows unit 30 and the spring 31 is reduced.

While the internal combustion engine is being run at a low rotational speed, the cycle of compression and expansion of the gas G in the bellows unit 30 is long. Further, heat exchange is promoted by the heat exchange promoting member 61, so that heat can be effectively exchanged between the gas G and the liquid 60. Thus, the gas G repeats isothermal change, so that the gas spring constant of the bellows unit 30 never increases practically.

While the internal combustion engine is being run at a high rotational speed, on the other hand, the cycle of compression and expansion of the gas G in the bellows unit 30 is short. In this case, the heat exchange between the gas G and the liquid 60 in the sealed space 55 cannot be accomplished in time. Accordingly, the properties of the gas G change adiabatically, so that the gas spring constant of the bellows unit 30 that serves as a gas spring increases.

For this reason, the gas spring constant of the bellows unit 30 increases when the rotational speed of the internal combustion engine becomes higher. Accordingly, the valve 13 can be restrained from jumping and bouncing. When the engine is run at a low rotational speed, on the other hand, the gas spring constant is lower than at the time of high-speed rotation. Thus, a friction loss of the valve train 10 is reduced. Further, surging of the valve 13 can be suppressed by a damping effect that is produced when the metallic inner bellows 50, outer bellows 51, and sealed space 55 extend and contract in the direction of the axis X.

The valve train 10 that comprises the spring apparatus 20A of the present embodiment can change a spring load by utilizing the change of state of the gas G that is sealed in the bellows unit 30. This valve train 10 is simple in construction, since it can dispense with a solenoid changeover valve, pipes, and external power for pressure control. Since the valve train 10 does not require any special energy for pressure change either, moreover, it is highly efficient and favorable for the improvement of the fuel consumption of the internal combustion engine.

Figure 3:
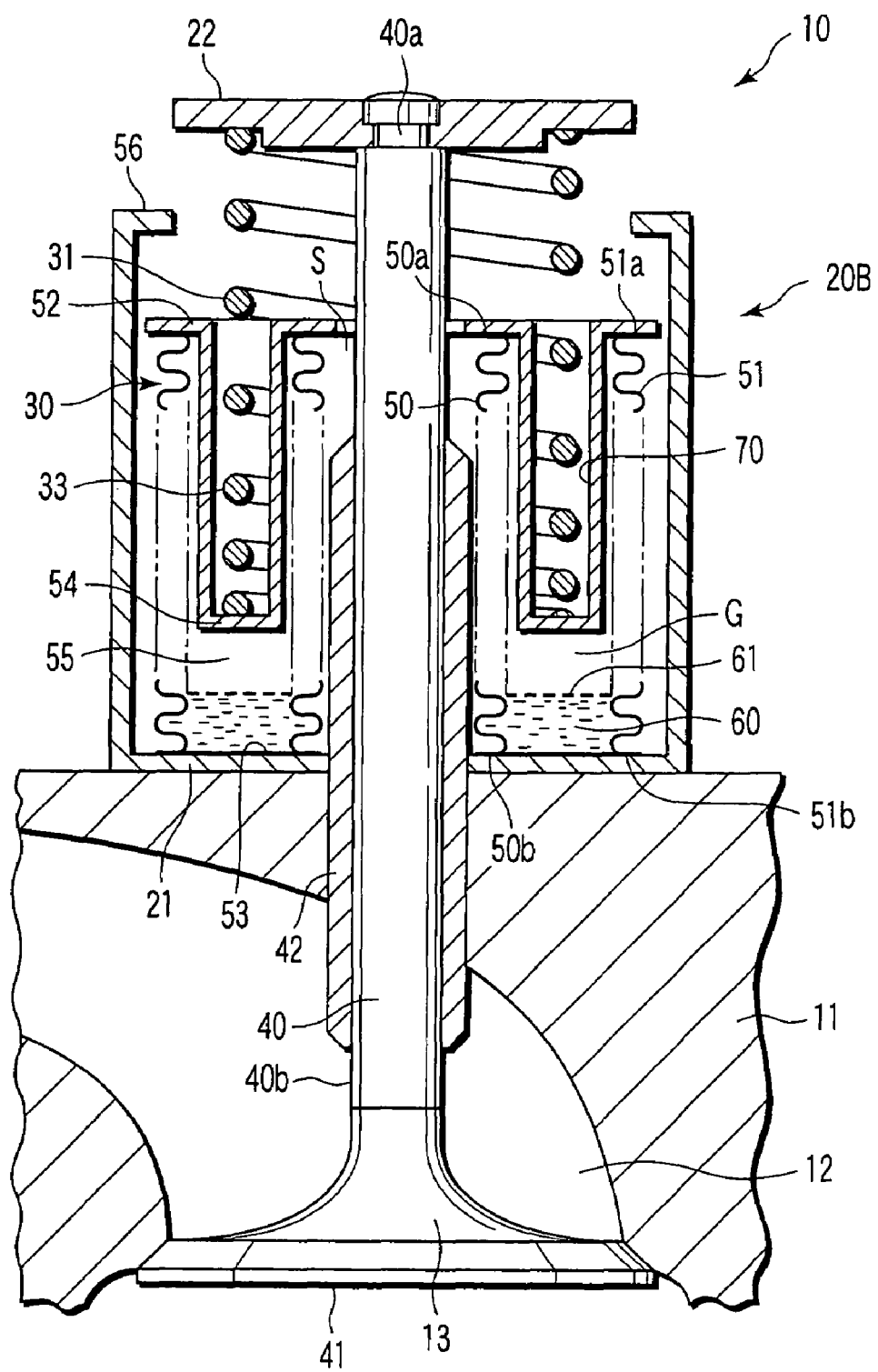
FIG. 3 is a sectional view of a valve train provided with a spring apparatus according to a second embodiment of the invention.

FIG. 3 shows a spring apparatus 20B according to a second embodiment of the present invention. Common numerals are used to designate common portions of this spring apparatus 20B and the spring apparatus 20A of the first embodiment, and a description of those portions is omitted. The following is a description of different portions.

A bellows unit 30 of the spring apparatus 20B of the second embodiment includes an inner bellows 50, an outer bellows 51, a first end member (first bellows cap) 52, and a second end member (second bellows cap) 53. A recess 70 is formed in the first end member 52 so as to indent the bellows unit 30. The recess 70 contains a part 33 of a compression coil spring 31.

According to the spring apparatus 20B of the second embodiment constructed in this manner, the part 33 of the compression coil spring 31 is held in the recess 70 of the bellows unit 30. Therefore, the length of the spring apparatus 20B with respect to the direction of the axis X can be made smaller than that of the spring apparatus 20A of the first embodiment. Thus, the spring apparatus 20B of the second embodiment enables the overall size of valve train 10 to be reduced.

Figure 4:
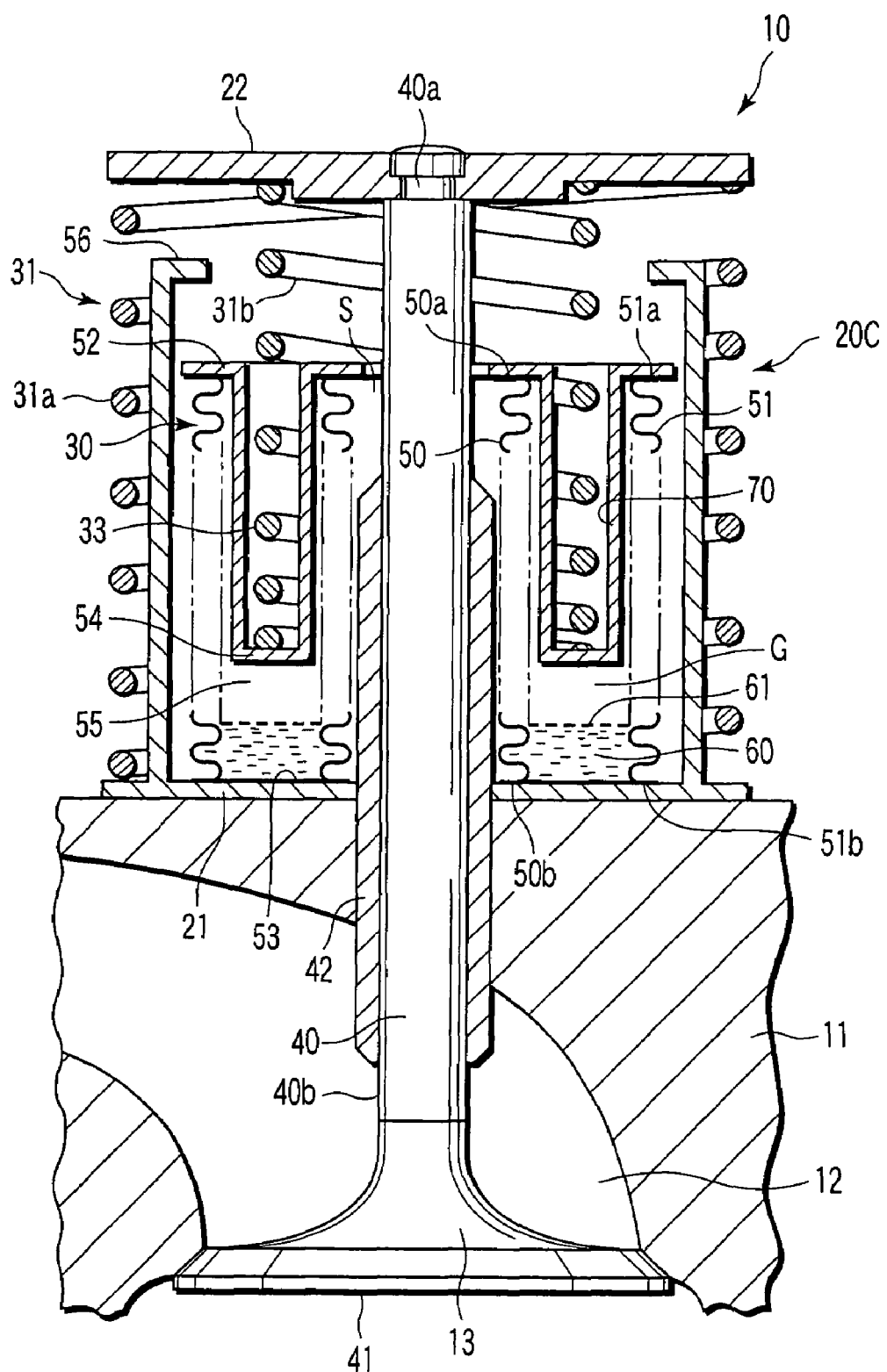
FIG. 4 is a sectional view of a valve train provided with a spring apparatus according to a third embodiment of the invention.

FIG. 4 shows a spring apparatus 20C according to a third embodiment of the present invention. A compression coil spring 31 of this spring apparatus 20C is composed of a double spring, which includes an outer spring 31$a$ and an inner spring 31$b$. The outer spring 31$a$ is located in parallel with a bellows unit 30 between a stationary spring receiving member 21 and a movable spring receiving member 22. The inner spring 31$a$, like the compression coil spring 31 of the spring apparatus 20B of the second embodiment, is located in series with a bellows unit 30. The spring apparatus 20C shares other configurations with the spring apparatus 20B of the second embodiment. Both the outer and inner springs 31$a$ and 31$b$ may be located in series or parallel with the bellows unit 30.

Figure 5:
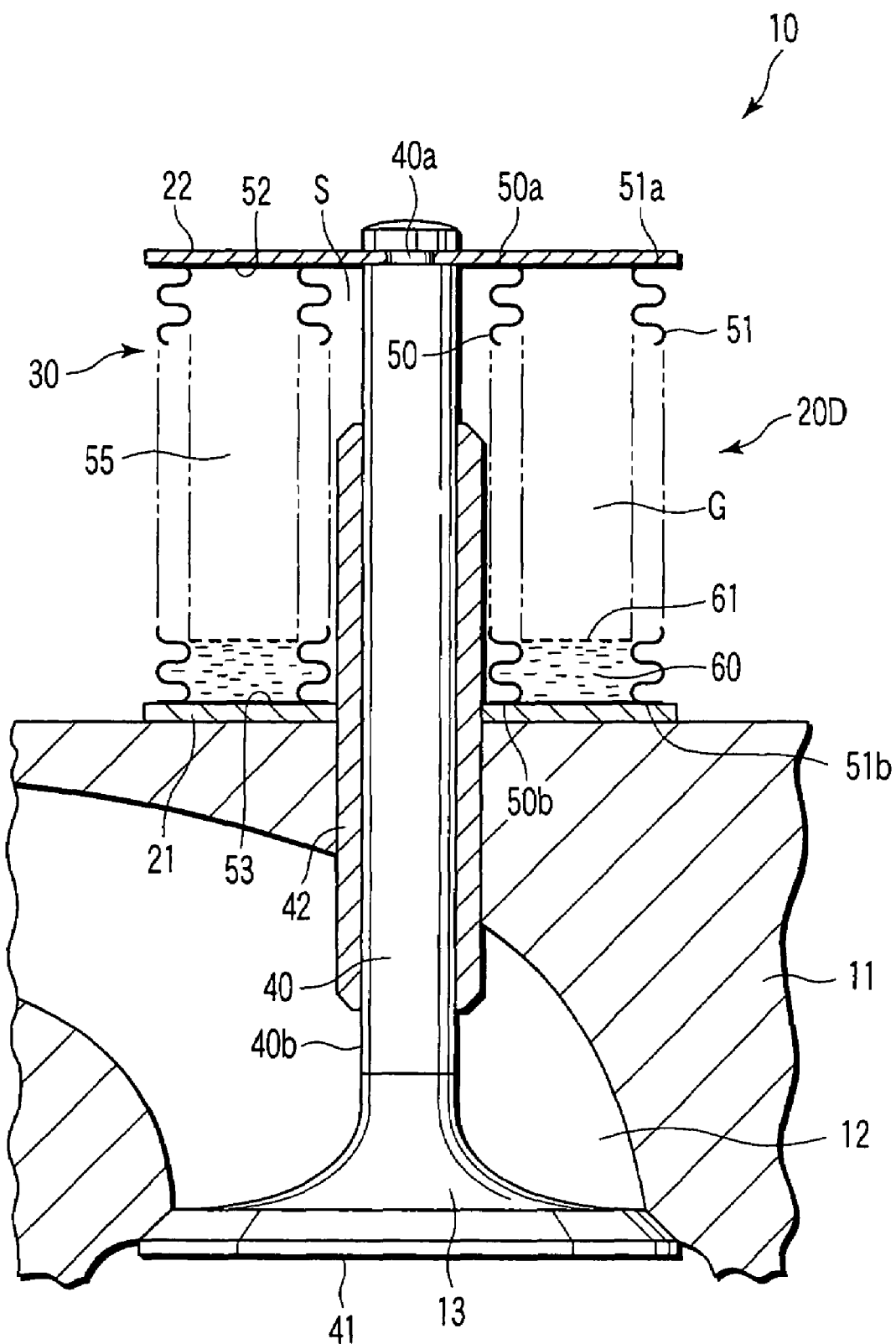
FIG. 5 is a sectional view of a valve train provided with a spring apparatus according to a fourth embodiment of the invention.

FIG. 5 shows a spring apparatus 20D according to a fourth embodiment of the present invention. The compression coil spring 31 is not used in this spring apparatus 20D. A valve 13 is urged in its closing direction by the repulsive force of the bellows unit 30 only. The spring apparatus 20D shares other configurations and effects with the spring apparatus 20A of the first embodiment. A first end member 52 may be integral with a movable spring receiving member 22.

Figure 6:
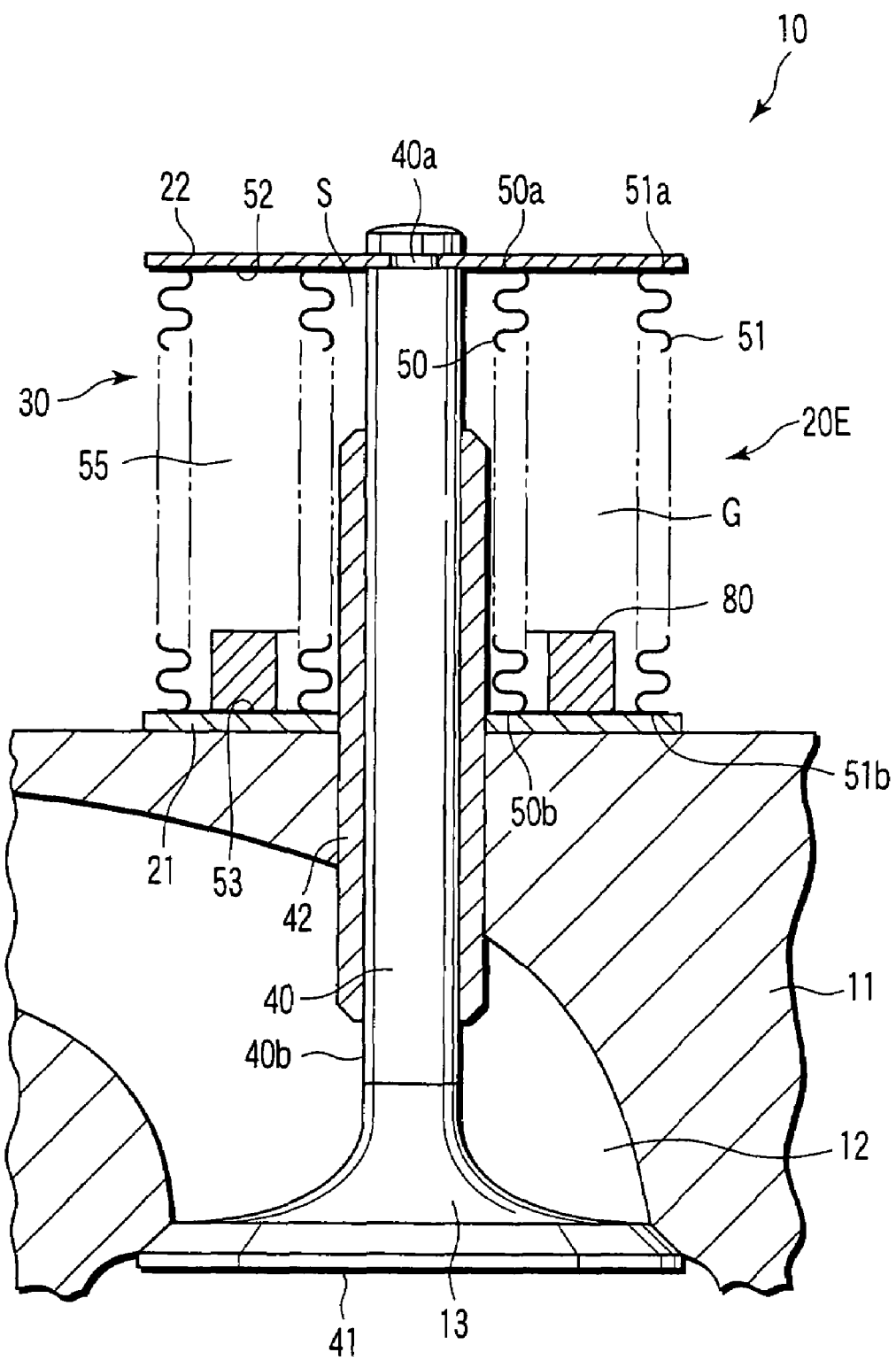
FIG. 6 is a sectional view of a valve train provided with a spring apparatus according to a fifth embodiment of the invention.

FIG. 6 shows a spring apparatus 20E according to a fifth embodiment of the present invention. A bellows unit 30 of this spring apparatus 20E uses a solid 80 as a heat exchange material that is contained in a sealed space 55. The thermal conductivity of the solid 80 is higher than that of the gas G.

The internal gas spring capacity of the sealed space 55 can be adjusted in accordance with the volume of the solid 80. Thus, the solid 80 can also serve for spring constant adjustment.

According to the spring apparatus of each of the embodiments described herein, the spring load of the valve train can be changed in accordance with the operating state of the internal combustion engine or the like. The valve train that uses the spring apparatus of each embodiment is simple in construction, since it can dispense with a solenoid changeover valve and pipes for spring load change. Further, the valve train does not require any external power or special energy for spring load change either.

The spring apparatuses of the present invention are applicable to other mechanisms as well, not just valve trains. It is to be understood that the components of the invention, including the first and second members, bellows unit, heat exchange material, and heat exchange promoting member, may be embodied in suitably modified forms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spring apparatus comprising:
   a first member having an axis;
   a second member which reciprocates in a direction of the axis with respect to the first member;
   a bellows unit which is located between the first member and the second member, and which is configured to extend and contract in the direction of the axis, and which has a sealed space therein;
   a gas which is sealed in a compressed state in the sealed space of the bellows unit, and which serves to extend the bellows unit in the direction of the axis;
   a heat exchange liquid which is contained in the sealed space of the bellows unit, and which serves to exchange heat with the gas; and
   a heat exchange promoting member which has a higher thermal conductivity than the liquid, and which is located between the gas and the liquid.

2. A spring apparatus according to claim 1, wherein the bellows unit comprises:
   an inner bellows;
   an outer bellows which is located outside the inner bellows so as to be concentric with the inner bellows, and which defines the sealed space in conjunction with the inner bellows;
   a first end member located between a first end of the inner bellows and a first end of the outer bellows; and
   a second end member located between a second end of the inner bellows and a second end of the outer bellows, and wherein the second member comprises a shaft portion which passes internally through the inner bellows in the direction of the axis.

3. A spring apparatus comprising:
   a first member having an axis;
   a second member which reciprocates in a direction of the axis with respect to the first member;
   a bellows unit which is located between the first member and the second member, and which is configured to extend and contract in the direction of the axis, and which has a sealed space therein;
   a gas which is sealed in a compressed state in the sealed space of the bellows unit, and which serves to extend the bellows unit in the direction of the axis;
   an uncompressible heat exchange material which is contained in the sealed space of the bellows unit, and which serves to exchange heat with the gas; and
   a compression coil spring located in series with the bellows unit between the first member and the second member.

4. A spring apparatus according to claim 3, wherein the bellows unit comprises:
   an inner bellows;
   an outer bellows which is located outside the inner bellows so as to be concentric with the inner bellows, and which defines the sealed space in conjunction with the inner bellows;
   a first end member located between a first end of the inner bellows and a first end of the outer bellows; and
   a second end member located between a second end of the inner bellows and a second end of the outer bellows, and wherein a recess is formed in the first end member so as to indent the bellows unit, the recess containing a part of the compression coil spring.

5. A spring apparatus according to claim 3, wherein adjacent turns of an element wire of an effective portion of the compression coil spring are in contact with one another when the compression coil spring is compressed so that a distance between the first member and the second member is not larger than a predetermined value.

6. A spring apparatus according to claim 3, further comprising a stopper portion for regulating an extension stroke of the bellows unit.

7. A valve train of an internal combustion engine provided with the spring apparatus according to claim 3, wherein the first member comprises a stationary spring receiving member attached to a cylinder head of the internal combustion engine, and the second member comprises a movable spring receiving member attached to a valve which opens and closes a port of the cylinder head, the valve being urged toward a closing position by the bellows unit.

* * * * *